(12) United States Patent
Skljarow et al.

(10) Patent No.: US 7,600,629 B2
(45) Date of Patent: Oct. 13, 2009

(54) CONVEYOR SYSTEM

(75) Inventors: Paul Skljarow, Schwieberdingen (DE); Delf Reumann, Stuttgart (DE); Boris Buesing, Stuttgart (DE); Karl Hinderer, Erdmannhausen (DE)

(73) Assignee: Bosch Rexroth AG, Stuttgart (DE)

( * ) Notice: Subject to any disclaimer, the term of this patent is extended or adjusted under 35 U.S.C. 154(b) by 303 days.

(21) Appl. No.: 11/489,137

(22) Filed: Jul. 19, 2006

(65) Prior Publication Data
US 2007/0017779 A1    Jan. 25, 2007

(30) Foreign Application Priority Data
Jul. 20, 2005    (DE)    ........................ 10 2005 033 946

(51) Int. Cl.
*B65G 49/00* (2006.01)
*B65G 47/00* (2006.01)
*B65G 41/00* (2006.01)

(52) U.S. Cl. ............... 198/465.1; 198/585; 198/867.13; 198/346.1; 198/414; 198/465.3

(58) Field of Classification Search ................ 198/598, 198/723, 798, 800
See application file for complete search history.

(56) References Cited

U.S. PATENT DOCUMENTS

| 4,326,625 | A | * | 4/1982 | Murzin et al. | ............ 198/468.2 |
|---|---|---|---|---|---|
| 4,899,865 | A | * | 2/1990 | Keil | ............................ 198/351 |
| 5,036,773 | A | * | 8/1991 | Christen | ................. 104/130.05 |
| 5,090,553 | A | * | 2/1992 | Focke | .................... 198/377.06 |
| 5,412,863 | A | | 5/1995 | Prodel | |
| 6,308,818 | B1 | * | 10/2001 | Bonora et al. | ............. 198/465.1 |
| 6,321,899 | B1 | * | 11/2001 | Hannessen | ................ 198/475.1 |
| 7,014,034 | B2 | * | 3/2006 | Brixius et al. | ............. 198/465.1 |

FOREIGN PATENT DOCUMENTS

| DE | 195 32 281 | 3/1997 |
|---|---|---|
| GB | 2 303 601 | 2/1997 |

* cited by examiner

*Primary Examiner*—Gene Crawford
*Assistant Examiner*—Yolanda Cumbess
(74) *Attorney, Agent, or Firm*—Michael J. Striker

(57) ABSTRACT

A conveyor system includes a conveyor track and at least one workpiece carrier that includes a first control curve and a second control curve, and a first control curve tracker and a second control curve tracker that are assigned to the conveyor track. The first control curve tracker is arranged in a first control engagement with the first control curve, and the second control curve tracker is arranged in a second control engagement with the second control curve. The control curves and associated control curve trackers are arranged so that the at least one workpiece carrier can be deflected laterally off of a subsection of the conveyor track via the interaction of the first control engagement and the second control engagement.

17 Claims, 9 Drawing Sheets

CONVEYOR SYSTEM

CROSS-REFERENCE TO A RELATED APPLICATION

The invention described and claimed hereinbelow is also described in German Patent Application DE 10 2005 033 946.8 filed on Jul. 20, 2005. This German Patent Application, whose subject matter is incorporated here by reference, provides the basis for a claim of priority of invention under 35 U.S.C. 119(a)-(d).

BACKGROUND OF THE INVENTION

The present invention generally relates to conveyor systems. More particularly the present invention relates to a conveyor system that includes a conveyor track with a conveying means that moves along at least a subsection of the conveyor track, and at least one workpiece carrier that is capable of being brought into driving engagement with the conveying means to be moved along the conveyor track.

The term "conveying means" as used in the context of the present invention can refer, e.g., to a conveyor track, a conveyor belt, a belt of a conveyor, a chain conveyor, or the like. The conveying system according to the present invention can be used, e.g., to convey workpiece carriers on an assembly line from one processing station to another. The term "workpiece carrier" should also be understood to mean conveyed item carriers in general, that is, e.g., carriers that convey goods that are not processed at a station of the conveyor track or that are used to process another component, but that are only transported to one station on the conveyor track, e.g., where the goods will be packaged or stored.

One problem that is always associated with generic conveyor systems is how to move the workpiece carriers along subsections of the conveyor track that are not straight, e.g., to turn around a 90° corner or to transition from a main route of the conveyor track to, e.g., a secondary route of the conveyor track that extends in parallel with the main route of the conveyor track. With the conveyor system made known in GB 2 303 601 A, the workpiece carrier includes, to this end, two downwardly-projecting pins that engage in a guide rail that includes two lateral guide surfaces. It has been proven in practice, however, that this type of guidance of the workpiece carriers very easily results in the pins tilting in the guide rails and, therefore, to blockage of the movement of the workpiece carriers.

SUMMARY OF THE INVENTION

It is therefore the object of the present invention to provide a conveyor system of the type described initially that is less susceptible to becoming blocked.

This object is attained according to the present invention by a conveyor system, with which the at least one workpiece carrier includes a first control curve and a second control curve, and a first control curve tracker and a second control curve tracker are assigned to the conveyor track, the first control curve tracker being in a first control engagement with the first control curve, and it being possible to bring the second control curve tracker into a second control engagement with the second control curve; the control curves and the associated control curve trackers are configured and/or located such that the at least one workpiece carrier is capable of being deflected laterally off of the subsection of the conveyor track via the interaction of the first control engagement and the second control engagement.

The control engagement between the control curves and the control curve trackers can preferably take place in a form-fit manner.

The objective of the present invention, to reduce the blockage of movement of the workpiece carriers, is attained via the combination, according to the present invention, of the fact that a separate control curve is assigned to each of the two control curve trackers, and of the fact that the control curves are located on the workpiece carrier and the control curve trackers are located on the conveyor track.

In order to provide the maximum amount of space for the control curves, it is provided that the control curves are configured on the underside of the workpiece carrier. The control curves could configured, e.g., as grooves that are preferably opened downward.

Accordingly, at least one control curve tracker can include an engagement element, e.g., an engagement pin, that extends in the vertical direction.

To ensure that each control curve tracker enters into control engagement only with the control curve assigned to it, it is basically possible for the initial sections of the control curves provided on a front end of the workpiece carrier to be located in different transverse positions of the workpiece carrier. Since, however, a portion of the overall available width of the conveyor track is taken up by the conveying means that includes, e.g., two parallel straps or belts, it is preferable for the control curves to be located at different vertical positions on the at least one workpiece carrier, e.g., as grooves having different depths. As a result, it is possible to locate both control curve trackers in the same transverse position yet still ensure that each of the control curve trackers enters into control engagement only with the control curve associated with it.

In order to be able to deflect only certain workpiece carriers in a continual series of workpiece carriers off of the subsection of the conveyor track, i.e., to enable realization of a switch function for the workpiece carriers, it is provided that at least one control curve tracker is designed to be height-adjustable, that is, e.g., the engagement element or the engagement pin of the control curve tracker. This vertical adjustment can be attained with any suitable type of adjusting device, e.g., an electrical, magnetic or electromagnetic adjusting device, an adjusting device that operates using an electric motor, or a pneumatic, hydraulic or hydro-pneumatic adjusting device, or one that functions according to another mode of operation.

In addition, the control curve trackers can be located in different vertical positions and/or their engagement elements can be adjustable in different vertical positions.

A basic deflection of the workpiece carrier can be attained, e.g., via the fact that the first control curve extends essentially in parallel with the longitudinal axis of the workpiece carrier, while the second control curve includes at least one control curve section that extends diagonally to the longitudinal axis. The control engagement between the first control curve and the first control curve tracker serves essentially as a movable swivel bearing for swiveling the workpiece carrier as a result of the control engagement between the control curve section—that extends diagonally to the longitudinal axis—of the second control curve and the second control curve tracker. If the first control curve extends adjacently to an edge of the workpiece carrier, the swiveling lever between the two control curve trackers can therefore be particularly large, which makes it easier to swivel the workpiece carrier.

For example, the second control curve—starting at its initial section provided on a front end of the workpiece carrier—can move increasingly further away from the first control curve along at least one subsection of its further course. The distance of the two control curves between the points of intersection of the two control curves is measured with a straight line that extends in the transverse direction of the workpiece carrier.

When the second control curve extends essentially in parallel with the first control curve along at least one subsection that borders its end section provided on a back end of the workpiece carrier, and preferably along the longitudinal center line of the workpiece carrier, the workpiece carrier can not only be swiveled via the control engagement of the two control curves with the two control curve trackers, but it can also subsequently move in a straight line over a path having a predetermined minimum length.

The swivel angle around which the workpiece carrier is swiveled as a result of the control engagement of the two control curves with the two control curve trackers is the angle formed by the first control curve with the line that connects the two control curve trackers when the second control curve tracker is located exactly at the transition point between the subsection of the second control curve that is moving away from the first control curve and the subsection of the second control curve that extends in parallel with the first control curve.

If the straight-line motion described above is not adequate, the workpiece carrier can include a third control curve that extends essentially parallel to the first control curve, preferably along the longitudinal center line of the workpiece carrier. A third control curve tracker can engage with this third control curve, the third control curve tracker being located on a straight line that extends through the second control curve tracker and forms the aforementioned swivel angle with the direction of conveyance.

The second control curve and the third control curve are located essentially at the same vertical position and preferably have the same groove depth.

In addition, the second control curve and the third control curve can transition into each other, i.e., the subsection of the second control curve that extends in parallel with the first control curve can coincide with the third control curve. The advantage of this is that the swiveling lever formed by the first control curve tracker and the second control curve tracker can have a long length.

To avoid the need to note which is the front end of the workpiece carrier and which is the back end, it is provided in a refinement of the present invention that the workpiece carrier includes at least two first control curves and at least two second control curves, and possibly also at least two third control curves located such that they are symmetric with respect to its transverse center line. If the two first control curves and, possibly, the two third control curves extend essentially parallel to the longitudinal axis of the workpiece carrier, they coincide. It is therefore truly necessary to form only one control curve. In terms of the second control curves, the subsection of one of the second control curves that is moving away from the first control curve transitions into the subsection of the other second control curve that extends in parallel with the first control curve. There is a risk, therefore, that a control curve tracker that is moving along one of the second control curves will not properly follow this second control curve to its end, but will mistakenly merge into the other control curve.

In order to counteract this undesired effect, it is provided in a refinement of the present invention that a guide element is provided in each of the outlet regions of the second control curves that is preloaded such that it also retains a control curve tracker on this subsection that has reached the subsection— that extends essentially parallel to the first control curve—of one of the second control curves. This guide element can include a—preferably spring-loaded—swiveling lever that is supported such that it is pivotable around an axis that extends essentially parallel to the vertical direction of the workpiece carrier.

So that the workpiece carrier can be deflected off of the conveyor track to the left or the right, it can be further provided that the workpiece carrier is designed such that it is symmetrical with respect to its longitudinal center line.

In a refinement of the present invention it is provided that the workpiece carrier has a rectangular base; the ratio of the length of the shorter transverse side to the length of the longer longitudinal side of the rectangle is between approximately 1.2 and approximately 1.667, and more preferably approximately 1.33. This makes it possible for even untrained personnel to easily identify the longitudinal direction of the workpiece carrier. As a result, the conveying engagement between the conveying means and the workpiece carrier—which is important in terms of moving the workpiece carrier—is maintained for a longer period of time even when deflection occurs.

The reliability of this conveying engagement can be further enhanced by the fact that a region in which the second control curve and the third control curve transition into each other has a distance from the front end of the workpiece carrier that is between approximately 0.15 times to approximately 0.35 times, preferably between approximately 0.25 times to approximately 0.30 times, and more preferably approximately 0.28 times the entire length of the workpiece carrier. As a result, the workpiece carrier first swivels essentially around a vertical axis that is located closer to its front end than its back end. In this context it should be pointed out that this swivel axis is not a swivel axis that is fixed relative to the workpiece carrier but, instead, that it can be displaced relative to the workpiece carrier, while its orientation in the vertical direction of the workpiece carrier is retained. As a result of this position of the swivel axis, the back end of the workpiece carrier moves strongly against the direction of deflection, i.e., it swivels outward.

As a result, an effective conveying engagement between the workpiece carrier and the conveying means is retained for a long period of time.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
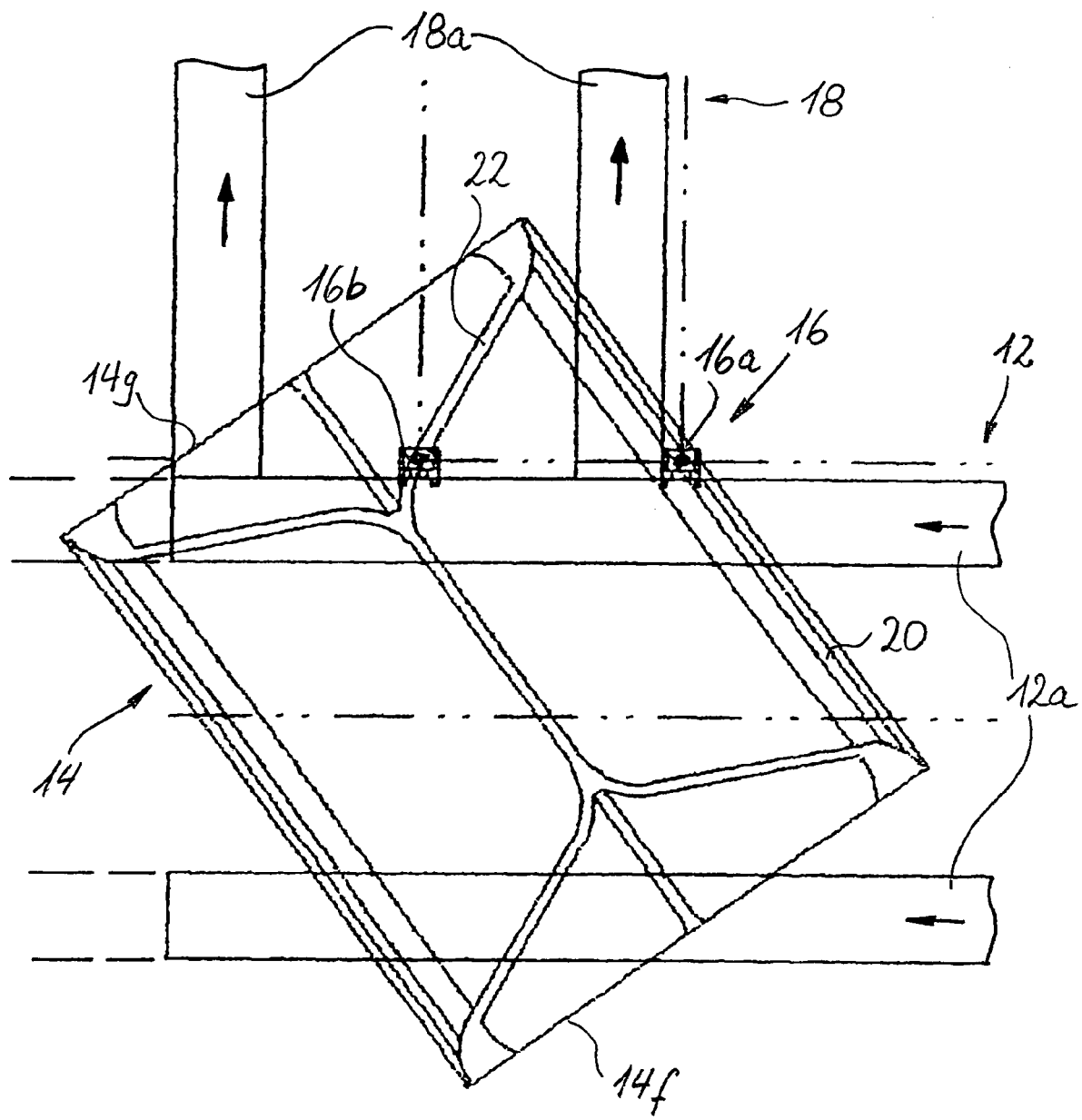
FIG. 1 shows a schematic top view of a conveying system according to the present invention; only the essential contours of the otherwise transparent workpiece carrier are shown, to ensure that the conveyor track located underneath can be seen.

A conveying system according to the present invention is labelled in general with reference numeral 10 in FIG. 1. It includes an incoming conveyor track 12, along which workpiece carriers 14 are conveyed from the right as shown in FIG. 1. Furthermore, a deflecting device 16 is provided that deflects workpiece carrier 14 from incoming conveyor track 12 to an outgoing conveyor track 18.

Incoming conveyor track 12 includes two conveyor belts 12*a* that are driven by means of a not-shown drive unit. In a similar manner, outgoing conveyor track 18 includes two conveyor belts 18*a* that are driven by means of a not-shown drive unit. For simplicity, the deflection rollers are not shown in the depiction in FIG. 1, around each of which the ends of endless conveyor belts 12*a*, 18*a* shown in FIG. 1 are redirected, so that they return to the other end—which is not shown in FIG. 1—of the two conveyor belts 12 and 18.

In FIG. 1, incoming conveyor track 12 and outgoing conveyor track 18 are parts of a main conveying track that, at the point shown in FIG. 1, forms a 90° curve or a 90° angle to the right. It is also basically possible that conveyor track 12 is part of the main conveying track that continues to the left in FIG. 1—which is indicated via dashed lines—and that conveyor track 18 is part of a secondary conveyance path, onto which at least some of workpiece carriers 14 are transferred.

In the first case, deflection device 16—which includes two deflection elements or deflection pins 16*a* and 16*b*—can be designed as a rigid, non-adjustable deflection device, while, in the second case, it is preferably designed as a switch, the deflection elements or deflection pins 16*a*, 16*b* of which can be selectively brought into or out of deflection engagement with workpiece carriers 14.

Figure 4A:
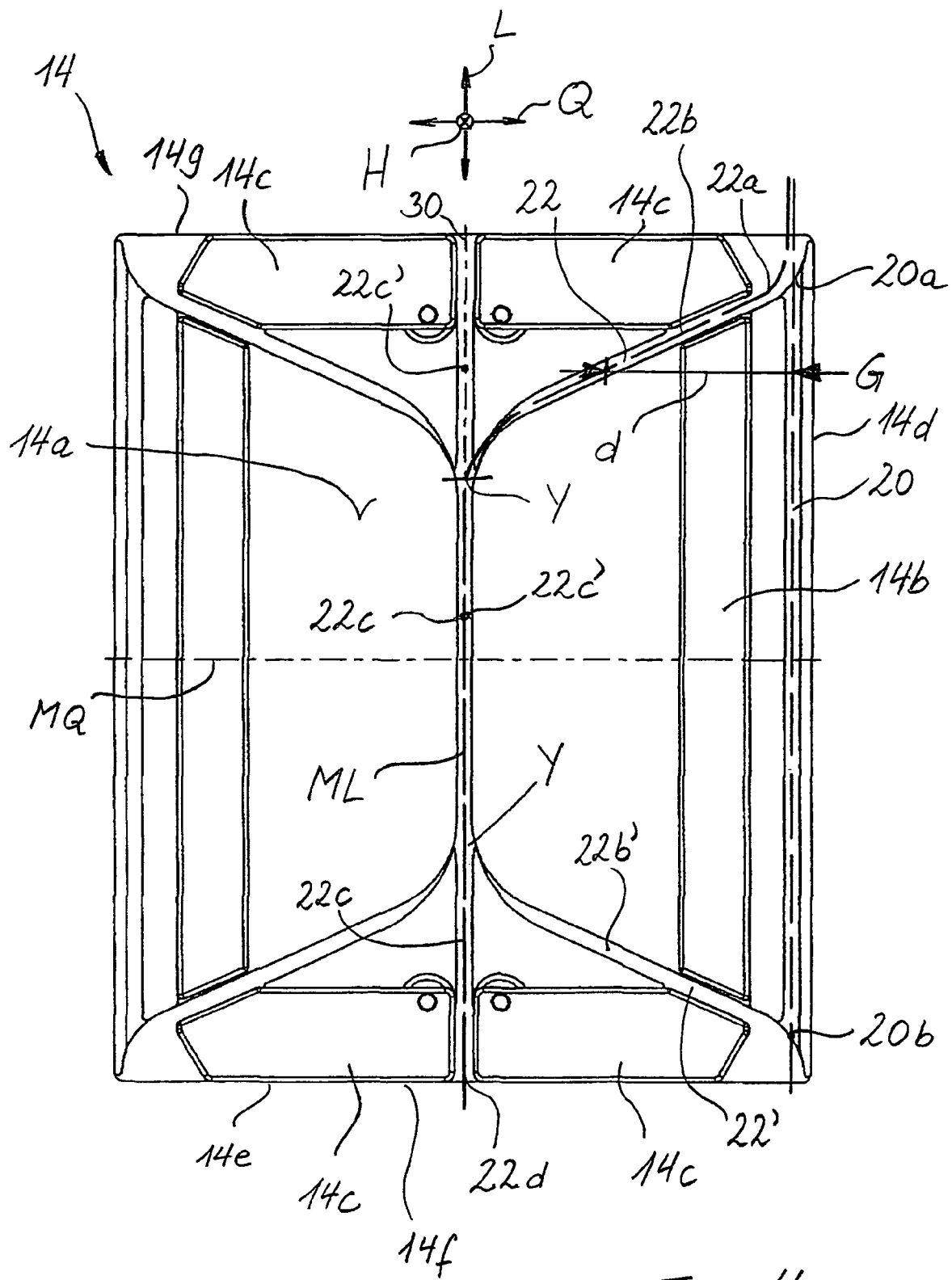
FIGS. 4a and 4b are underside views of a workpiece carrier according to the present invention that serve to explain its mode of operation.

The basic design of workpiece carrier 14 and its interaction with deflection elements 16*a* and 16*b* of deflection device 16 will be explained in greater detail below with reference to FIGS. 4*a* and 4*b*: An underside view under a workpiece carrier 14 according to the present invention is shown in FIG. 4*a*. Lower surface 14*a* of workpiece carrier 14 includes two support segments 14*b* that extend in longitudinal direction L of workpiece carrier 14, with which workpiece carrier 14 is supported when transported in a straight line along conveyor tracks 12, 18 on conveyor belts 12*a*, 18*a*, and it includes support segments 14*c* that extend in transverse direction Q of conveying carrier 14 and engage with conveyor belts 12*a*, 18*a* after workpiece carrier 14 makes a deflected motion from an incoming conveyor track 12 onto an outgoing conveyor track 18.

In addition, a first downwardly open groove 20 and a second downwardly open groove 22 are formed in the underside 14*a* of workpiece carrier 14. In the exemplary embodiment shown, the depths of the two grooves 20 and 22 are different. In particular, groove 20—as shown, e.g., in FIG. 4*a*, e.g., via line 20*a* at the entrance of the groove—does not extend into underside 14*a* of workpiece carrier 14 as far as groove 22 does. If, as it moves along conveyor track in shown in FIG. 1, workpiece carrier 14 now moves toward first deflection element 16*a*—which does not project as far above conveyor track 12 as second deflection element 16*b*—this first deflection element 16*a* can engage with groove 20. If, as workpiece carrier 14 continues to move along conveyor track 12, it moves toward second deflection element 16*b*, second deflection element 16*b* slides along surface 20*a* at the entrance to groove 20 and thereby engages with second groove 22.

While first groove 20 extends, across its entire length, essentially in parallel with edge 14*d* of workpiece carrier 14, second groove 22—in its subsection 22*b* that abuts groove inlet 22*a*—extends diagonally with respect to edge 14*d*, i.e., its distance d from first groove 20 increases as the distance away from groove inlet 20*a*, 22*a* increases. This distance d is determined by the point of intersection of the two grooves 20, 22 with a straight line G that extends in the transverse direction Q at the particular point.

According to the aforementioned, groove 20 forms a first control groove or control curve that enters into control engagement with first deflection element 16*a* that is a first control curve tracker, while second groove 22 is a second control groove or control curve that enters into control engagement with second deflection element 16*b* designed as the second control curve tracker. Via the interaction of these two control engagements with the advancing effect carried out by conveyor belts 12*a* on workpiece carrier 14, the workpiece carrier is swiveled around a swivel axis that extends essentially in vertical direction H of workpiece carrier 14 (see FIG. 1). This swivel axis is not fixed relative to workpiece carrier 14. Instead, it moves relative to workpiece carrier 14. This is expressed by the fact, e.g., that first deflection element 16*a* in first groove 20 does not move continually from groove inlet 20*a* to groove outlet 20*b*, but rather that this movement includes segments of motion in which deflection element 16*a* moves back in the direction toward groove inlet 20*a* as a result of the swiveling motion of workpiece carrier 14.

In the embodiment according to FIG. 4*a*, second groove 22 extends to longitudinal center axis ML of workpiece carrier 14 and, from there, it extends—in a second subsection 22*c*—essentially parallel to edge 14*d* of workpiece carrier 14 and, therefore, parallel with first groove 20 toward groove end 22*d*. As soon as second deflection element 16*b* has entered groove section 22*c*, therefore, the deflection motion of workpiece carrier 14 has ended, and it again moves in a straight line along outgoing conveyor track 18.

As shown in the illustration in FIG. 1, the conveying engagement between lower conveyor belt 12*a*—as shown in FIG. 1—and workpiece carrier 14 is the driving force for the swiveling of workpiece carrier 14. In terms of deflection elements 16*a* and 16*b*, upper conveyor belt 12*a*—as shown in FIG. 1—of conveyor track 12 has a swiveling lever that is too short to enable effective swiveling, and the two conveyor belts 18*a* of outgoing conveyor track 18 are not in any noteworthy conveying engagement with workpiece carrier 14 until near the end of the swiveling motion. In order to ensure that this swiveling engagement takes place between lower conveyor belt 12*a* of incoming conveyor track 12 and workpiece carrier 14, the following actions were taken, according to the present invention:

Transverse segments 14*c* (see FIG. 4*a*) were provided. In addition, workpiece carrier 14 was designed rectangular in shape, with a longer longitudinal side 14*d* and a shorter transverse side 14*e* (see FIG. 4*a*). Finally, the extension of second groove 22 was designed such that back end 14*f* of workpiece carrier 14 swivels outwardly away from the direction of deflection, i.e., downwardly, as shown in FIG. 1.

Also with reference to FIG. 4*a*, it is clear that workpiece carrier 14 is designed such that it is symmetrical with respect to longitudinal center axis ML and transverse center axis MQ. As a result, it is possible for workpiece carrier 14 to be deflected to the left or right from incoming conveyor track 12, depending on which side of conveyor track 12 deflection device 16 is located. In addition, operating personnel do not have to pay attention to the orientation in which they place workpiece carrier 14 on conveyor track 12, i.e., whether end 14f or end 14g of workpiece carrier 14 is at the front.

The fact that workpiece carrier 14 is designed to be symmetrical around transverse center axis MQ is decisive to its function, since first section 22b, 22b'—which extends diagonally to edge 14d—of the two grooves 22, 22' which are symmetrical to each other transitions into second subsection 22c', 22c of the particular other groove 22', 22 that extends in parallel with edge 14d. There is a risk, therefore, that a deflection element 16b that moves along groove 22 will mistakenly merge—in the region of the transition of first subsection 22b' of groove 22' into second subsection 22c of groove 22 labeled Y in FIG. 4a—into first subsection 22b' of groove 22' and will not follow the further course of second subsection 22c of groove 22 to its end 22d.

To prevent this, lever elements 26 are provided (see FIG. 4b), each of which is mounted such that it can swivel around a swivel axis extending essentially in vertical direction H, it being possible to deflect these lever elements 26—that are preloaded in the position shown in FIG. 4a via a not-shown spring—out of this position via engagement with deflection element 16b.

Figure 2A:
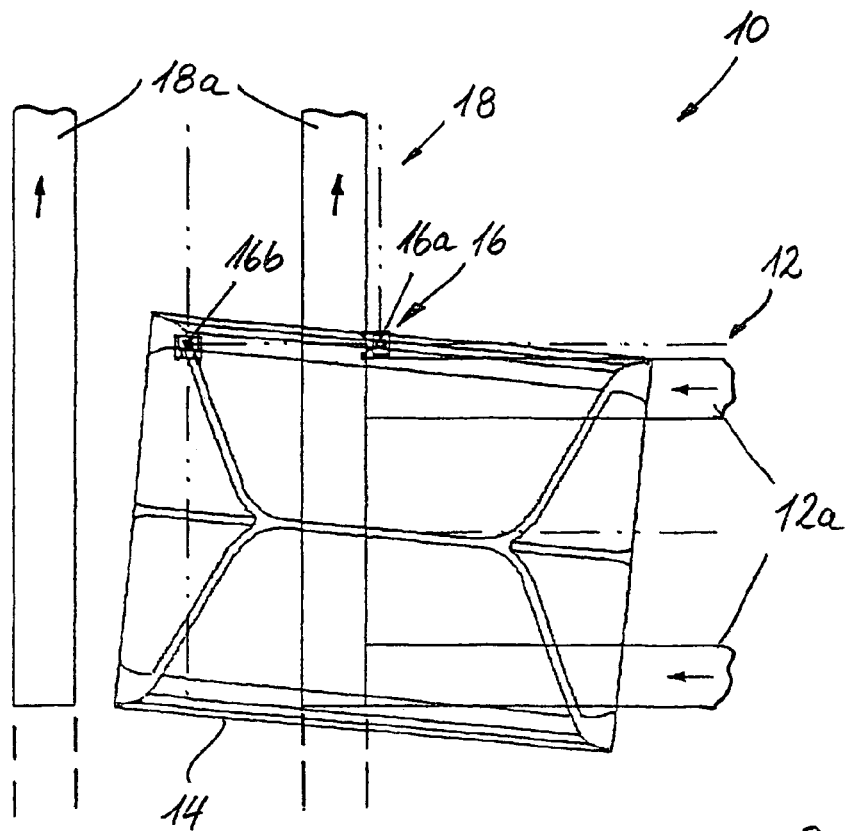
FIGS. 2a and 2b are views similar to FIG. 1 of a further use of the conveying system according to the present invention.
Figure 2B:
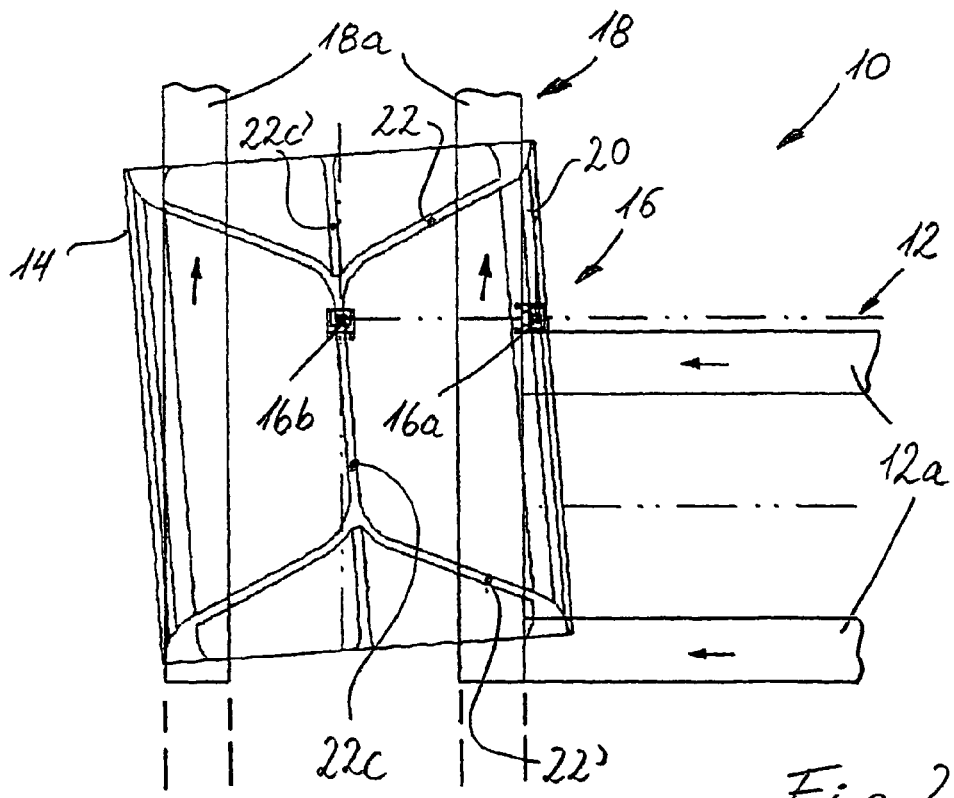

As shown in FIGS. 2a and 2b, outgoing conveyor track 18 does not necessarily have to abut the side of incoming conveyor track 12. Instead, it is also possible for incoming conveyor track 12 to run into outgoing conveyor track 18. Due to this arrangement of conveyor tracks 12, 18, it is also possible to form a 90° curve or a 90° angle, in which case conveyor tracks 12, 18 are sections of a main conveyance path. It is also possible for conveyor track 12 to be part of a secondary conveyance path, from which workpiece carrier 14 is transferred to a main conveyance path that includes conveyor track 18.

As shown in FIG. 2a, at the beginning of the swiveling motion, the conveying engagement between lower conveyor belt 12a of incoming conveyor track 12 with workpiece carrier 14 is the primary driving force in this case as well, while, toward the end of the swiveling motion, conveyor belt 18a—shown at the left in FIG. 2b—of outgoing conveyor track 18 becomes increasingly significant.

It should also be noted that deflection elements 16a and 16b in the exemplary embodiment shown in FIGS. 2a and 2b can be rigid in design and, in fact, regardless of whether conveyor tracks 12 and 18 are now part of a main path of the conveyance system, or whether conveyor track 12 is part of a secondary path, from which workpiece carriers 14 are transferred to the main conveyance path of the conveyance system.

Whether or not a workpiece carrier is transferred or not cannot be controlled by deflection elements 16a, 16b. Instead, an additional stopping device must be provided, e.g., a separating device. In addition, deflection elements 16a and 16b do not hinder the movement of workpiece carrier 14 along main conveyance path 18, since deflection element 16a simply moves through first groove 20 of workpiece carrier 14 and second deflection element 16b moves through the combination of two straight subsections 22c and 22c' of the two grooves 22 and 22' that are symmetrical to the transverse center line of workpiece carrier 14. It should not be overlooked, however, that the deflection device is also configured as a switch in this case, i.e., as a deflection device with selectively height-adjustable deflection elements 16a, 16b.

As shown in FIGS. 3a through 3d, the secondary conveyance path does not necessarily have to form a 90° angle with the main conveyance path. Instead, it is possible for the main conveyance path and the secondary conveyance path to extend essentially parallel with each other.

Since the exemplary embodiment according to FIGS. 3a through 3d differs from the exemplary embodiments according to FIGS. 1, 2a and 2b in terms of the arrangement of the two conveyor tracks and the number and arrangement of the deflection elements of the deflection device, the reference numerals for the individual components shown in FIGS. 3a through 3d are the same as the reference numerals used to label the corresponding components in the exemplary embodiments shown in FIGS. 1, 2a and 2b, but increased by 100. It should be pointed out, however, that the workpiece carriers in particular have the same configuration in all of the exemplary embodiments. In addition, the description of the exemplary embodiment according to FIGS. 3a through 3d below will be limited to the differences from the exemplary embodiments according to FIGS. 1, 2a and 2b. Reference is hereby made expressly to the description of the latter figures.

In FIGS. 3a through 3d, the conveyor track of the main conveyance path is labelled 112. The conveyor track of the secondary conveyance track is labelled 118, and numeral 116 labels the deflection device that transfers a workpiece carrier 114 from conveyor track 112 to conveyor track 118.

Deflection device 116 includes two deflection elements 116a and 116b located on the side of conveyor track 112, which correspond to deflection elements 16a and 16b in the depiction according to FIGS. 1, 2a and 2b, since they serve to deflect workpiece carrier 114 by swiveling them off of conveyor track 112. In particular, deflection element 116a located the furthest upstream relative to direction of conveyance F enters into control engagement with first control groove 120 of workpiece carrier 114, and deflection element 116b following it, relative to direction of conveyance F, enters into control engagement with second control groove 122 of workpiece carrier 114.

Figure 3A:
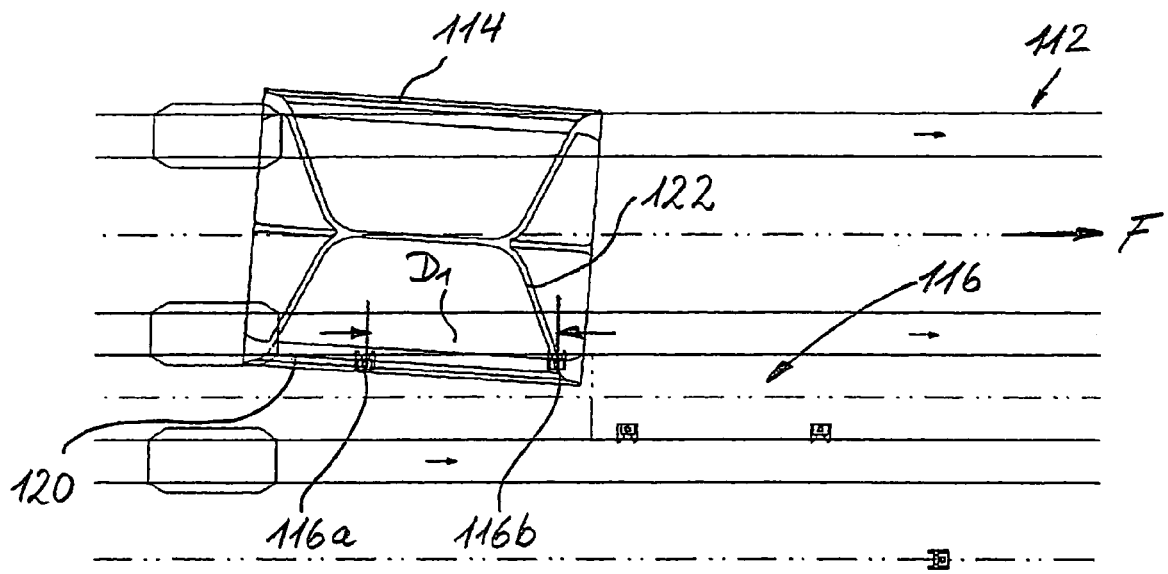
FIGS. 3a through 3d are views similar to FIG. 1 of a further use of the conveying system according to the present invention.
Figure 3B:
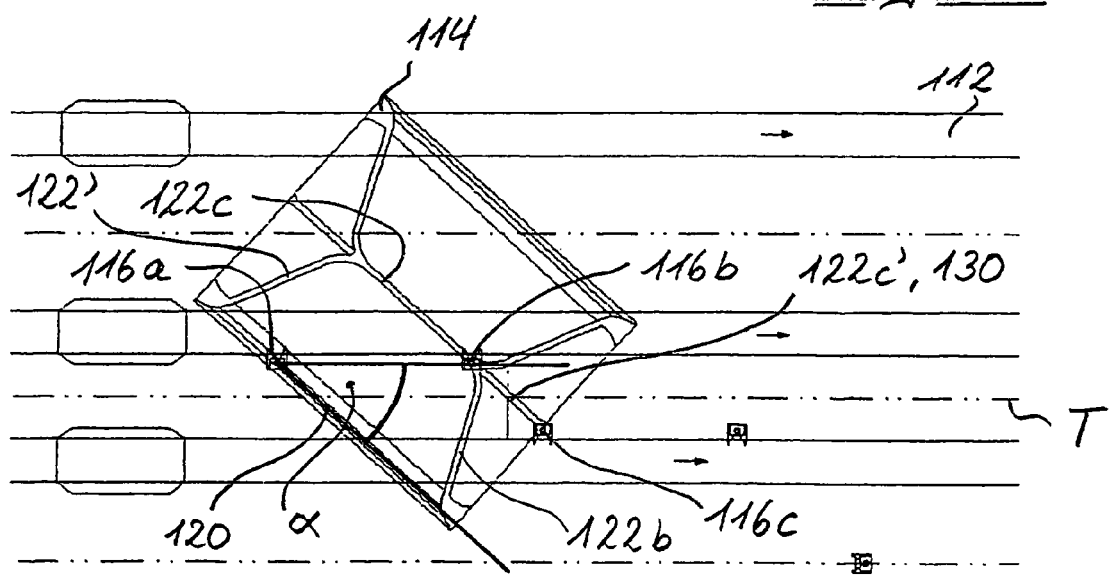

At the point in time depicted in FIG. 3b when workpiece carrier 114 makes the transition movement from conveyor track 112 to conveyor track 118, second deflection element 116b is located exactly at the transition from first subsection 122b to second subsection 122c of second control groove 122 of workpiece carrier 114. As shown in FIG. 3b, distance D1 (see FIG. 3a) between the two deflection elements 116a and 116b is selected such that, at this point in time, angle α—formed by the two deflection elements 116a and 116b with longitudinal extension of first control groove 120—corresponds to the desired deflection angle, which is approximately 45° in this case.

When the two deflection elements 116a and 116b are in control engagement with the two control grooves 120, 122 of workpiece carrier 114, workpiece carrier 114 will move along a straight line in the direction defined by angle α in the further course of the transfer movement from conveyor track 112 to conveyor track 118 due to the fact that control groove 120 is parallel with second subsection 122c of second control groove 122. With reference to the depictions shown in FIGS. 1, 2a and 2b, it should be noted that distance D1 between the two deflection elements 16a and 16b in those figures is selected such that the deflection angle is 90°.

At the point in time depicted in FIG. 3b, a third deflection element 116c enters into control engagement with second subsection 122c' of the other second control groove 122' of workpiece carrier 114 and, during the further course of the transfer movement of workpiece carrier 114, moves in a straight line along longitudinal center line ML of workpiece carrier 114. The combination of second subsections 122c, 122c' of the two control curves 122, 122' forms a third control curve 130 of workpiece carrier 114 (see also reference numeral 30 in FIG. 4a).

Third deflection element 116c is located on the side of conveyor track 118 facing first conveyor track 112 and, in fact, in the longitudinal direction of conveyor track 118 at a position such that the line connecting deflection elements 116b and 116c forms the desired deflection angle α with this longitudinal extension direction T. If third control groove 130—which is also basically feasible and which will be described in greater detail below with reference to FIGS. 5 and 6—is formed in workpiece carrier 114 independently of the second control grooves 122 and 122', the distance between the two control grooves 122 and 130 would also have to be taken into consideration when positioning third deflection element 116c and, in fact, it would have to be multiplied by a factor that is equal to the reciprocal of the sine of deflection angle α ($1/\sin \alpha$).

It should also be noted that deflection element 116a is a deflection element of the first type, i.e., a deflection element that extends less further above conveyor track 112 than deflection element 116b, which is a deflection element of the second type. Since, in the exemplary embodiment shown, the second subsections 122c and 122c' of second control grooves 122, 122' coincide with third control groove 130, and they therefore have the same depth as the second control grooves 122, 122', third deflection element 116c is a deflection element of the second type.

Figure 3C:
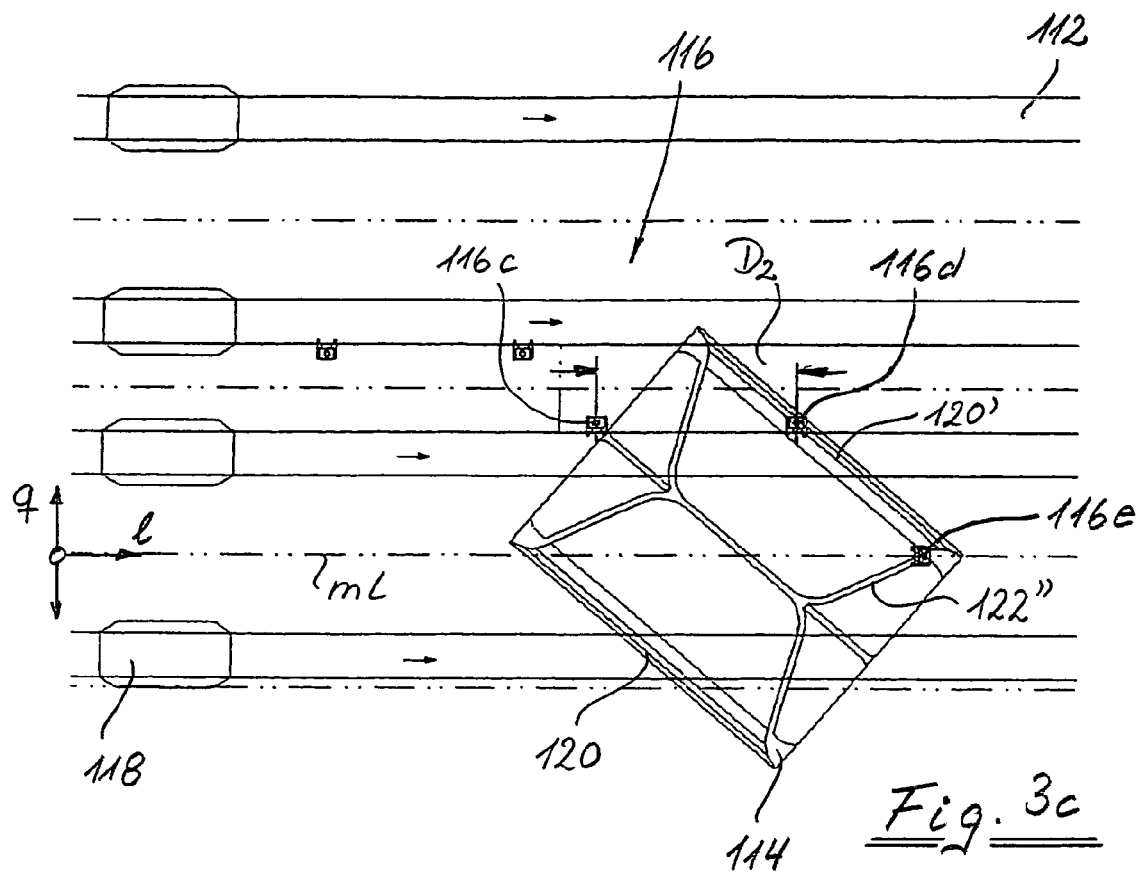
Figure 3D:
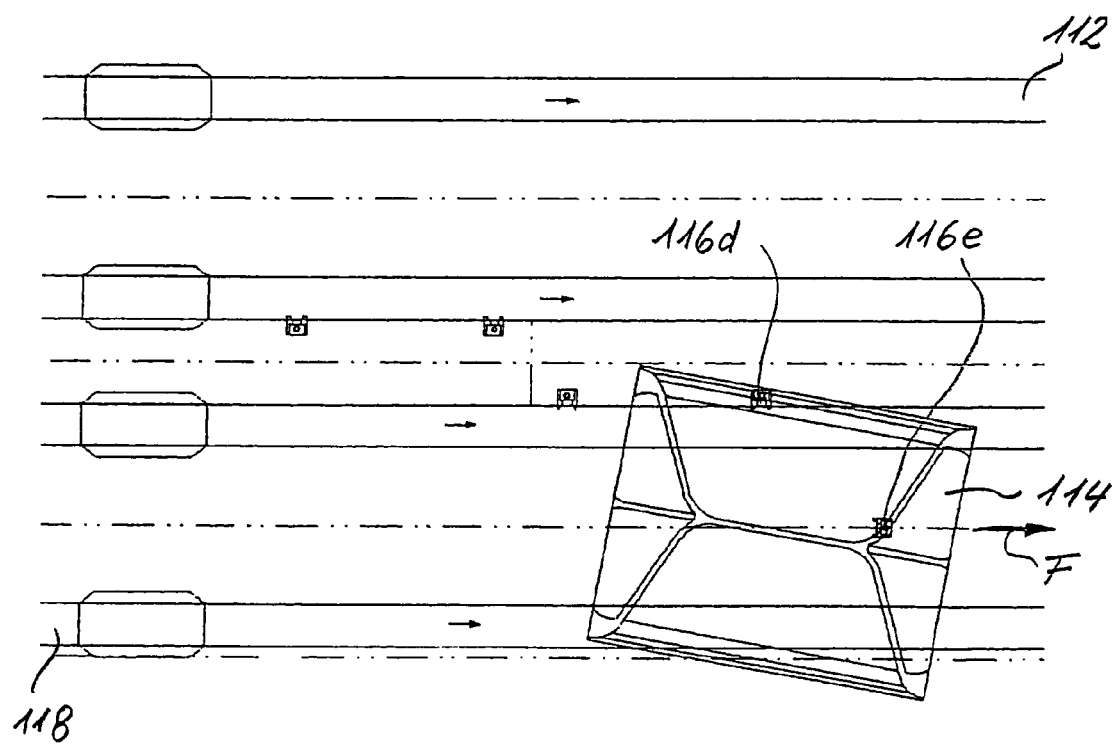

As shown in FIG. 3c, deflection device 116 also includes a fourth deflection element 116d and a fifth deflection element 116e, which ensure that workpiece carrier 114 swivels back into the direction of conveyance F of conveyor track 118 (see also FIG. 3d).

As a result of the movement of workpiece carrier 114 straight ahead, deflection element 116d enters into control engagement—at desired deflection angle α—with a second straight control groove 120', which corresponds to control groove 120 but that is located on the other longitudinal edge of workpiece carrier 114. Since control grooves 120 and 120' have the same depth, fourth deflection element 116d is a deflection element of the first type. Fourth deflection element 116d is aligned with deflection element 116c as viewed in the direction of conveyance F, i.e., it is located in the same transverse position as third deflection element 116c in transverse direction q of conveyor track 118. In longitudinal direction I of conveyor track 118, the two deflection elements 116c and 116d are separated by distance D2, however, which is the same as distance D1 between deflection elements 116a and 116b ist (see FIG. 3a).

Fifth deflection element 116e is located on the longitudinal center line ml of conveyor track 118, with respect to which conveyor belts 118a of conveyor track 118 are also symmetrical. In addition, the line connecting deflection elements 116d and 116e with conveyance direction F or longitudinal center line ml of conveyor track 118 forms desired deflection angle α. In addition, an additional offset could be taken into account in the embodiments shown in FIGS. 5 through 8.

Fifth deflection element 116e is a deflection element of the second type. As such, it cannot enter into control engagement with control groove 120', but it can enter into control engagement with control groove 122" that is symmetrical with control groove 122 around longitudinal center line ML of workpiece carrier 114. In this manner, workpiece carrier 114 is swiveled back into conveyance direction F as a result of the control engagement of deflection elements 116d and 116e with control grooves 120' and 122", so that workpiece carrier 114 now moves along conveyor track 118 of secondary conveyance path.

FIGS. 5 through 8 show roughly schematic depictions of workpiece carriers, each having different courses of the first, second and third control grooves. With these workpiece carriers, however, all of the deflection motions described above with reference to FIGS. 1, 2a, 2b and 3a through 3d are possible to the left and to the right. With all embodiments according to FIGS. 5 through 8, this requires that the workpiece be designed symmetrical with respect to longitudinal center line ML.

Figure 4B:
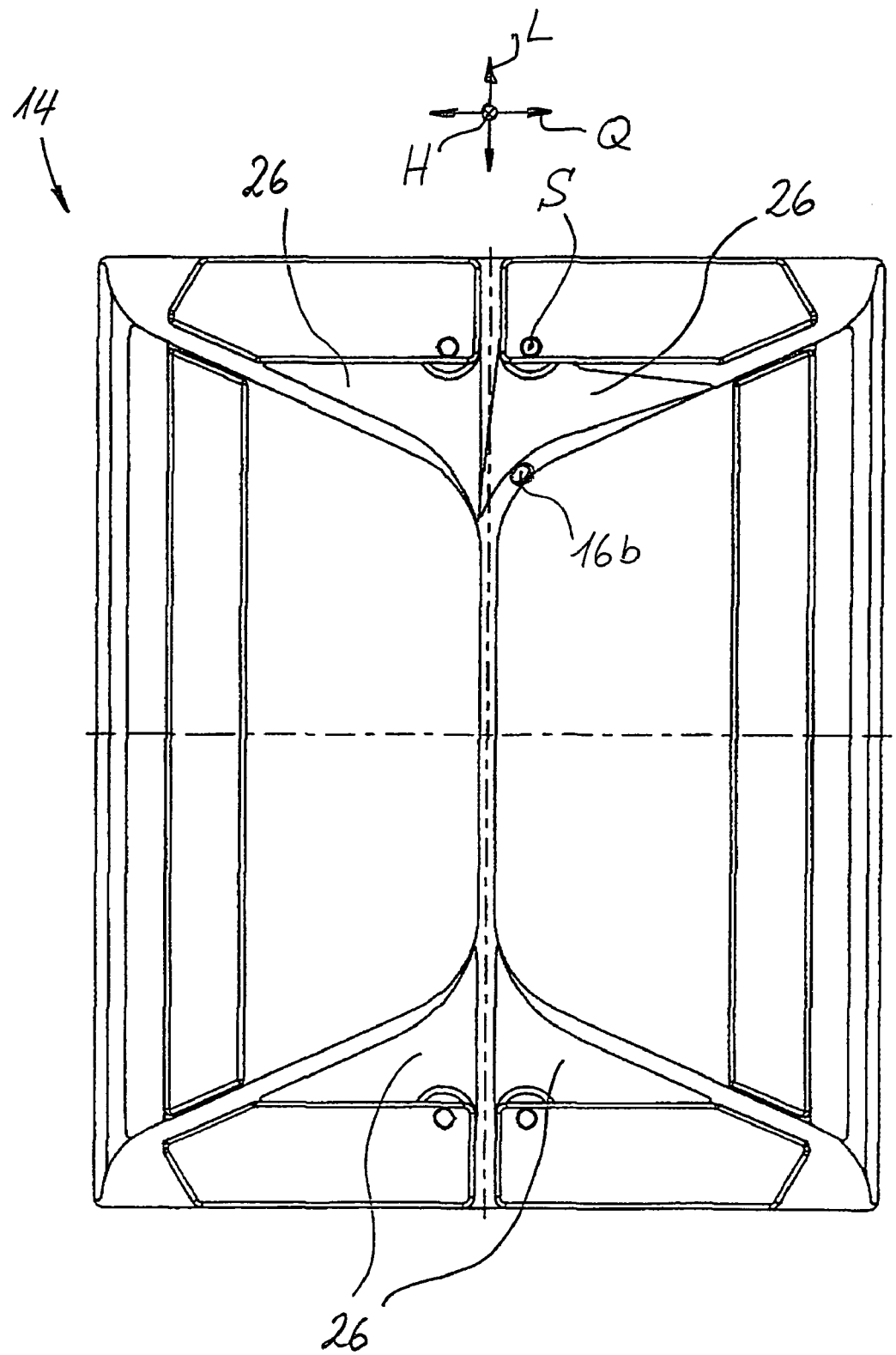
Figure 5:
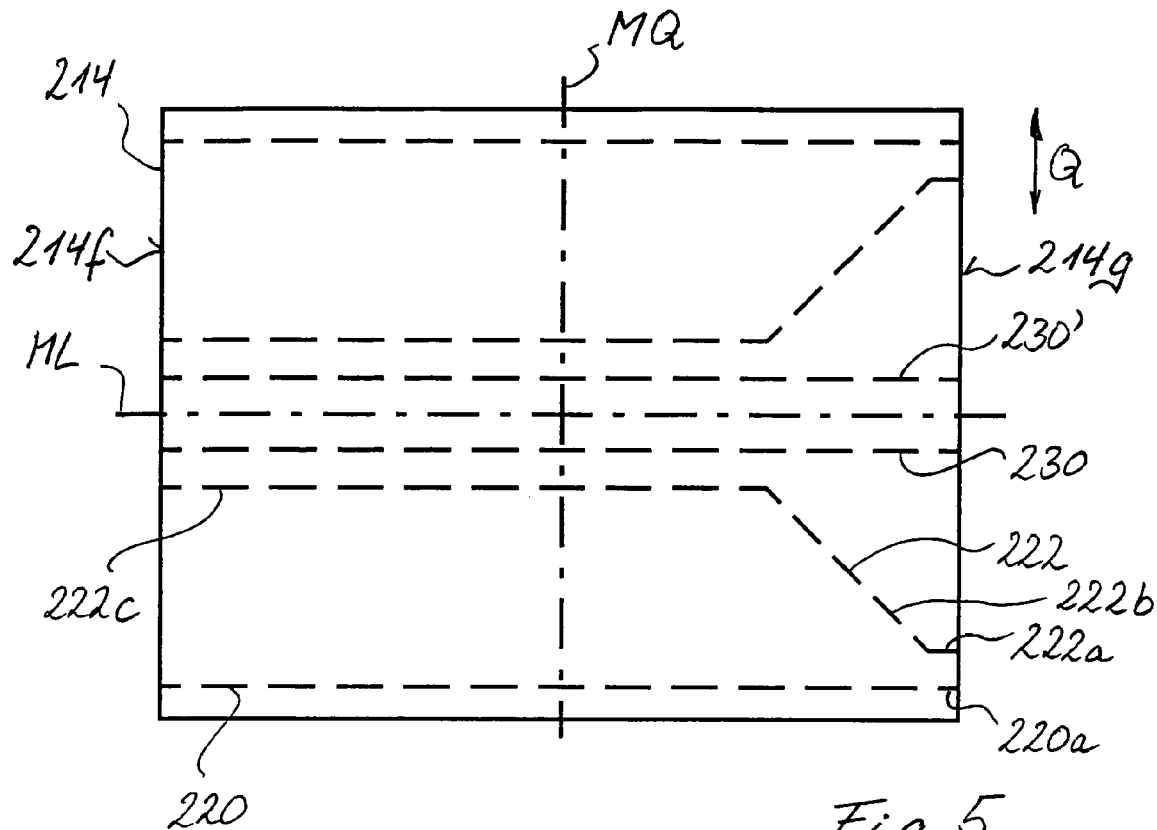
FIGS. 5 through 8 are schematic underside views of workpiece carriers that serve to explain the embodiments.

A first modified embodiment of a workpiece carrier is shown in FIG. 5, the design of which essentially conforms with that of the embodiments described above. For this reason, components shown in FIG. 5 that are identical to components in FIGS. 1, 2a, 2b, 4a and 4b are assigned the same reference numbers, but increased by 200. In addition, the description of the embodiment according to FIG. 5 presented below will be limited to the differences from the embodiments described above. Reference is hereby made expressly to the description of the latter figures.

With the exemplary embodiment according to FIG. 5, the three control grooves 220, 222 and 230 of workpiece carrier 214 are shown separated. This means that initial sections 220a of first control groove 220 and 222a of second control groove 222 are located at different positions in the transverse direction Q of workpiece carrier 214. In contrast to the embodiments discussed above, control grooves 220 and 222 can have the same groove depth, since it is ensured that they can be distinguished in terms the control engagement with the deflection elements via their different transverse positions. Furthermore, second subsection 222c of second control groove 222 extends separately from third control groove 230, i.e., first subsection 222b of second control groove 222 does not transition into third control groove 230. Finally, third control grooves 230, 230' that are symmetrical to longitudinal center line ML of workpiece carrier 214 are also shown separated.

Workpiece carrier 214 shown in FIG. 5 is not symmetrical with respect to transverse center line MQ. The result of this is that the operating personnel must take note that end 214g shown at the right in FIG. 5 is the front end of workpiece carrier 214, and end 214f is its back end.

Figure 6:
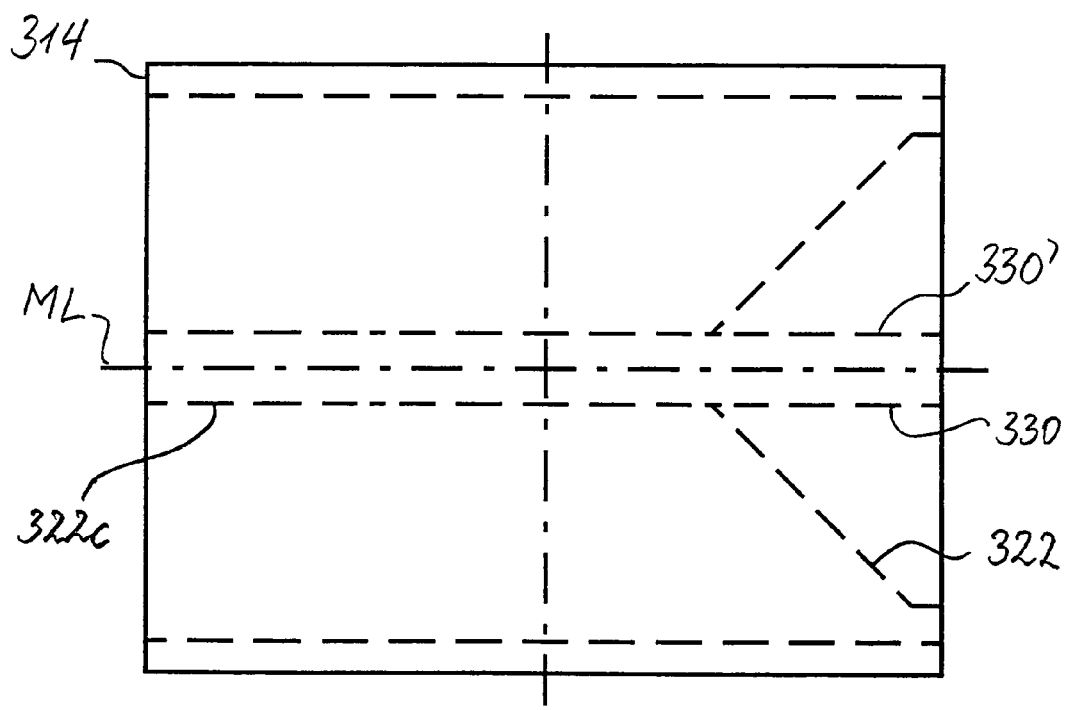
Figure 7:
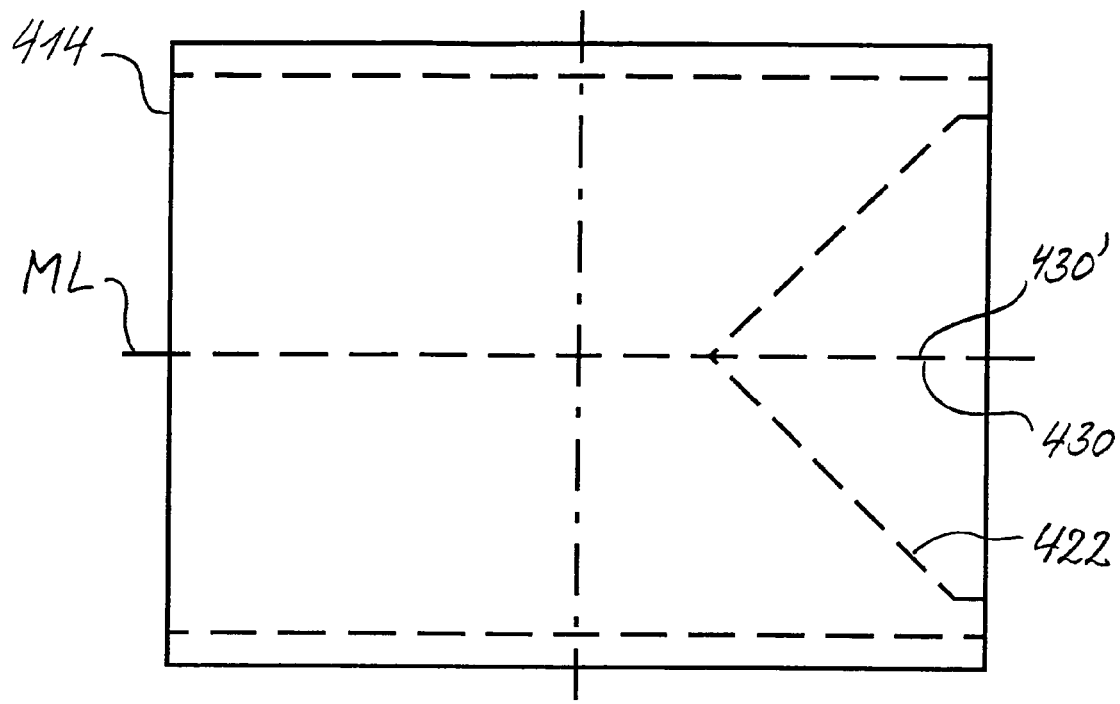

Further modified embodiments of a workpiece carrier are shown in FIGS. 6 and 7, the design of which essentially conforms with that of the embodiments described above. For this reason, components shown in FIGS. 6 and 7 that are identical to components in FIGS. 1, 2a, 2b, 4a and 4b are assigned the same reference numbers, but increased by 300 or 400, respectively. In addition, the description of the embodiment according to FIGS. 6 and 7 presented below will be limited to the differences from the embodiments described above. Reference is hereby made expressly to the description of the latter figures.

The only difference between workpiece carrier 314 according to FIG. 6 and workpiece carrier 214 shown in FIG. 5 is the fact that second subsection 322c of second control groove 322 coincides with third control groove 330, although it is separate from third control groove 330' that is symmetrical thereto with respect to longitudinal center line ML.

With workpiece carrier 414 according to FIG. 7, the two third control grooves 430 and 430' also coincide and they both extend along longitudinal center line ML of workpiece carrier 414.

Given that workpiece carriers 214, 314, 414 are designed asymmetrical to transverse center line MQ, none of these workpiece carriers needs to be provided with swiveling levers that correspond to lever 26 shown in FIG. 4b. With workpiece carrier 214 according to FIG. 5, second control groove 222 and third control groove 230 are still separate. With workpiece carriers 314 and 414 according to FIGS. 6 and 7, due to the feed direction of the workpiece carriers and the transition angle of second control grooves 322 and 422 into third control groove 330 or 430, there is no risk that the associated deflection element will mistakenly move in the particular control groove.

Figure 8:
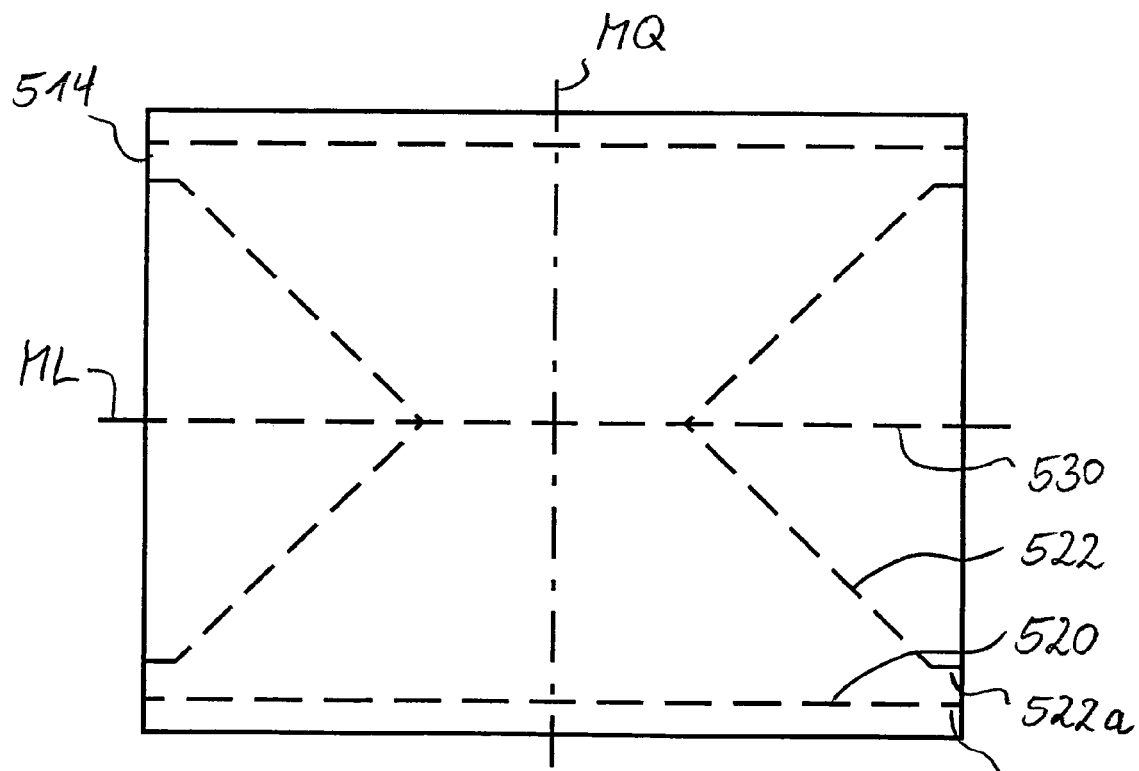

A further modified embodiment of a workpiece carrier is shown in FIG. 8, the design of which essentially conforms with that of the embodiments described above. For this reason, components shown in FIG. 8 that are identical to components in FIGS. 1, 2a, 2b, 4a and 4b are assigned the same reference numbers, but increased by 500. In addition, the description of the embodiment according to FIG. 8 presented below will be limited to the differences from the embodiments described above. Reference is hereby made expressly to the description of the latter figures.

In contrast to the embodiments shown in FIGS. 5 through 7, with workpiece carrier 514 according to FIG. 8—which differs from the embodiment according to FIG. 7 only in terms of the course of control grooves 520, 522 and 530 by the fact that they are designed symmetrical with respect to transverse center line MQ—swiveling lever that corresponds to levers 26 shown in the embodiment according to FIG. 4b must be provided, although this is not shown in FIG. 8.

Although the embodiment according to FIG. 8 is very similar to the embodiments shown in FIGS. 1, 2a and 2b, 3a through 3b and 4a and 4b, it should be noted that it differs from them in that inlet sections 520a and 522a of first control groove 520 and second control groove 522 are located at different transverse positions of workpiece carrier 514.

Figure 9:
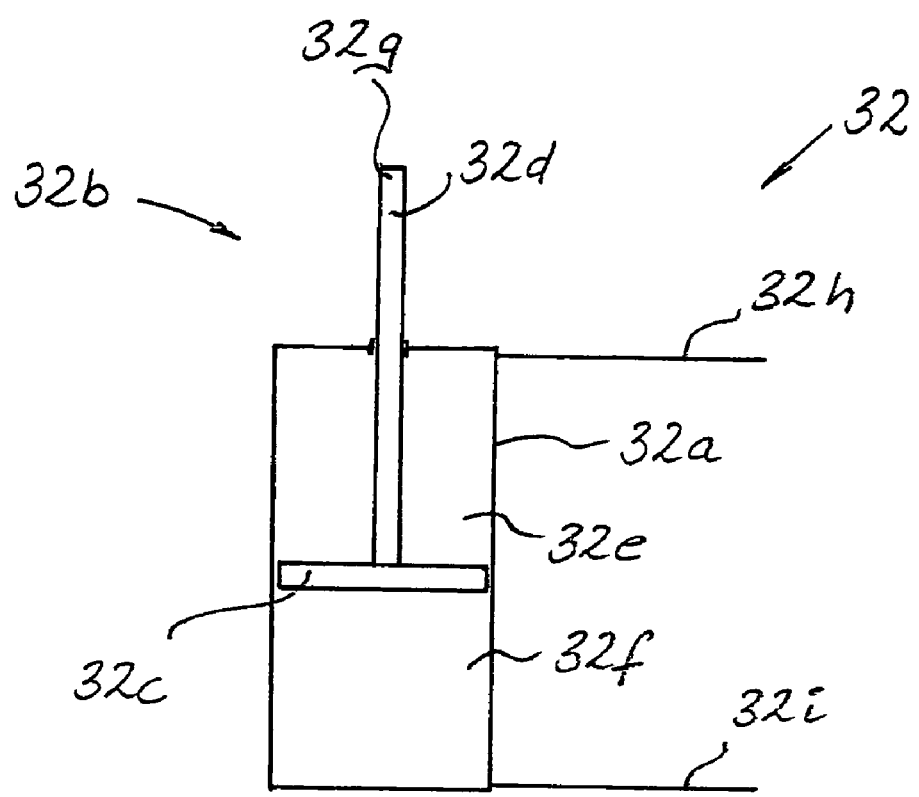
FIG. 9 is a schematic depiction of a deflection element.

With reference to FIG. 9 it should also be noted that deflection elements 16a, 16b and 116a through 116e can be designed, e.g., as pneumatic and/or hydraulic actuating devices 32 with a housing 32a and an actuator 32b that includes a piston 32c and a piston rod 32d. Piston 32c is displaceably mounted in housing 32a and subdivides its interior into two working chambers 32e, 32f. Piston rod 32d extends out of housing 32a, so that its free end 32g is the actual engagement part that engages with control grooves 20, 22, 30, etc. Working chambers 32e, 32f can be supplied with pressure fluid via two lines 32h and 32i, so that actuator 32b can be selectively extended out of housing 32a or retracted back into it.

The factor that determines whether actuating device 32 is a deflection element of the first type (e.g., a deflection element 16a) or a deflection element of the second type (e.g., deflection element 16b) is the length of the piston rod 32d. The fact that the height of actuator 32b can be adjusted makes it easy to realize a switch function for the movement of workpiece carriers 14, 114, 214, 314, 414, 514, with the aid of which only certain workpiece carriers in a continual series of workpiece carriers can be deflected from the subsection of the conveyor track, while other workpiece carriers continue their motion along the subsection of the conveyor track.

It will be understood that each of the elements described above, or two or more together, may also find a useful application in other types of constructions differing from the types described above.

While the invention has been illustrated and described as embodied in a conveyor system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A conveyor system, comprising:
   a conveyor track with conveying means that moves along at least one subsection of said conveyor track; and
   at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said engagement element of said at least one control curve tracker is configured as an engagement pin, and wherein said control curves are formed as grooves that open downwards, which are located on said at least one workpiece carrier in different vertical positions.

2. A conveyor system, comprising:
   a conveyor track with conveying means that moves along at least one subsection of said conveyor track; and
   at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said control curves are configured as grooves having different depths.

3. A conveyor system, comprising:
   a conveyor track with conveying means that moves along at least one subsection of said conveyor track; and
   at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said control curve trackers are located in different vertical positions.

4. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said control curve trackers have engagement elements which are adjustable in different vertical positions.

5. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said first control curves extends substantially parallel to a longitudinal axis of said workpiece carrier, while said second control curve includes at least one control curve section that extends diagonally to the longitudinal axis.

6. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said second control curve, starting at its initial section provided on a front end of said workpiece carrier, extends along subsection of its further course increasingly far away from said first control curve.

7. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said second control curve extends along a longitudinal center line of said workpiece carrier.

8. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said workpiece carrier includes a third control curve that extends substantially parallel to said first control curve.

9. A conveyor system as defined in claim 8, wherein said third control curve extends along a longitudinal center line of said workpiece carrier.

10. A conveyor system as defined in claim 8, wherein said second control curve and said third control curve are located substantially at a same vertical position.

11. A conveyor system as defined in claim 8, wherein said second control curve and said third control curve have a same groove depth.

12. A conveyor system as defined in claim 8, wherein said second control curve and said third control curve transition into each other.

13. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein said workpiece carrier includes at least two said first control curves and at least two said second control curves, which are located such that they are symmetrical with respect to a transverse center line of said workpiece carrier.

14. A conveyor system as defined in claim 13; and further comprising a guide element provided in each of outlet regions of said second control curves and preloaded such that said guide element also retains a control curve tracker of a subsection that has reached the subsection.

15. A conveyor system, comprising:
a conveyor track with conveying means that moves along at least one subsection of said conveyor track; and
at least one workpiece carrier arranged for driving engagement with said conveying means to be moved along said conveyor track, said at least one workpiece carrier including a first control curve and a second control curve, and a first control curve tracker and a second control curve tracker assigned to said conveyor track and configured so that said first control tracker is arranged for a first control engagement with said first control curve and said second control curve tracker is arranged for a second control engagement with said second control curve, said control curves and said control curve trackers further configured and/or located such that said at least one workpiece carrier is deflectable laterally off of the at least one subsection of the conveyor track via an interaction of said first control engagement and said second control engagement, wherein a region in which said second control curve and or two second control curves transition into each other has a distance from a front end of said workpiece carrier that is between substantially 0.15 times to substantially 0.35 times an entire length of said workpiece carrier.

16. A conveyor system as defined in claim 15, wherein said distance from said front end of said workpiece carrier is between substantially 0.25 times and substantially 0.30 times an entire length of said workpiece carrier.

17. A conveyor system as defined in claim 15, wherein said distance from said front end of said workpiece carrier is substantially 0.28 times of an entire length of said workpiece carrier.

* * * * *